(12) United States Patent
Osawa

(10) Patent No.: US 12,090,734 B2
(45) Date of Patent: Sep. 17, 2024

(54) GAS BARRIER FILM AND METHOD FOR PRODUCING GAS BARRIER FILM

(71) Applicant: TOPPAN INC., Tokyo (JP)

(72) Inventor: Kenta Osawa, Tokyo (JP)

(73) Assignee: TOPPAN INC., Tokyo (JP)

( * ) Notice: Subject to any disclaimer, the term of this patent is extended or adjusted under 35 U.S.C. 154(b) by 246 days.

(21) Appl. No.: 17/588,551

(22) Filed: Jan. 31, 2022

(65) Prior Publication Data

US 2022/0153000 A1 May 19, 2022

Related U.S. Application Data

(63) Continuation of application No. PCT/JP2020/029013, filed on Jul. 29, 2020.

(30) Foreign Application Priority Data

Aug. 2, 2019 (JP) .................................. 2019-143284

(51) Int. Cl.
| | |
|---|---|
| B32B 27/08 | (2006.01) |
| B32B 7/12 | (2006.01) |
| B32B 27/16 | (2006.01) |
| B32B 27/32 | (2006.01) |
| B32B 37/24 | (2006.01) |

(52) U.S. Cl.
CPC ............... *B32B 27/08* (2013.01); *B32B 7/12* (2013.01); *B32B 27/16* (2013.01); *B32B 27/32* (2013.01); *B32B 37/24* (2013.01); *B32B 2037/246* (2013.01); *B32B 2255/10* (2013.01); *B32B 2255/20* (2013.01); *B32B 2307/7244* (2013.01); *B32B 2439/46* (2013.01)

(58) Field of Classification Search
None
See application file for complete search history.

(56) References Cited

U.S. PATENT DOCUMENTS

| | | | | |
|---|---|---|---|---|
| 5,137,955 A | * | 8/1992 | Tsuchiya ................. | B32B 27/08 524/320 |
| 2009/0181244 A1 | * | 7/2009 | Fukugami ............... | B32B 27/34 428/476.3 |
| 2013/0196099 A1 | * | 8/2013 | Sakamoto ............... | B32B 27/34 428/688 |

(Continued)

FOREIGN PATENT DOCUMENTS

| | | | |
|---|---|---|---|
| JP | S60-49934 A | 3/1985 | |
| JP | 7-330922 A | 12/1995 | |
| JP | H07/330922 | * 12/1995 | ............. B32B 15/08 |

(Continued)

OTHER PUBLICATIONS

Hashimoto—JP H07-330922 A—PCT D3—MT—unstretched PP w-metal deposition—1995 (Year: 1995).*

(Continued)

*Primary Examiner* — John Vincent Lawler
(74) *Attorney, Agent, or Firm* — Foley & Lardner LLP

(57) ABSTRACT

A gas barrier film includes: a substrate mainly composed of polyethylene or polypropylene; a gas barrier layer formed on the substrate; and a cover layer formed on the gas barrier layer; a surface of the substrate on which the gas barrier layer is formed has an element ratio O/C between oxygen and carbon of 0.03 or more.

11 Claims, 2 Drawing Sheets

(56) References Cited

U.S. PATENT DOCUMENTS

2019/0023468 A1    1/2019   Ishii et al.

FOREIGN PATENT DOCUMENTS

| JP | 10-323938 | A | 12/1998 | | |
|---|---|---|---|---|---|
| JP | H10/323938 | * | 12/1998 | ............. | B32B 15/08 |
| JP | 2004/314562 | * | 11/2004 | ............. | B32B 18/00 |
| JP | 2004-314562 | A | 11/2004 | | |
| JP | 2009-101620 | A | 5/2009 | | |
| JP | 2014/114493 | * | 6/2014 | ............. | B32B 27/30 |
| JP | 2014-114493 | A | 6/2014 | | |

OTHER PUBLICATIONS

Fukagai—JP H10-323938 A—PCT D1—MT—metal coated PP film w-motivation for O—C ratio—1998 (Year: 1998).*

Kanetaka—JP 2004-314562 A—PCT D4—MT—ceramic vapor deposition film—2004 (Year: 2004).*
Matsui—JP 2014-114493 A—PCT D2—MT—plastic for vapor deposition—2014 (Year: 2014).*
Kim—Composite oxygen-barrier coating on PP container—2013 (Year: 2013).*
International Searching Authority, "International Search Report," issued in connection with International Patent Application No. PCT/JP2020/029013, dated Oct. 6, 2020, 7 pages.
International Searching Authority, "Written Opinion," issued in connection with International Patent Application No. PCT/JP2020/029013, dated Oct. 6, 2020, 5 pages.
Extended European Search Report issued in corresponding European Patent Application No. 20850811.9 dated Aug. 11, 2022.
Office Action issued in connection with Japanese Appl. No. 2021-537253 dated Jul. 28, 2023.
Office Action issued in corresponding European Patent Application No. 20850811.9 dated Nov. 17, 2023 (5 pages).
Hiroshi Osuga, "New Food Packaging Films: All About Flexible Packaging", p. 328, Apr. 18, 1994.

* cited by examiner

GAS BARRIER FILM AND METHOD FOR PRODUCING GAS BARRIER FILM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/029013, filed on Jul. 29, 2020, which is based upon and claims the benefit of priority to Japanese Patent Application No. 2019-143284, filed on Aug. 2, 2019; the disclosures of which are incorporated herein by reference in their entirety.

TECHNICAL FIELD

The present invention relates to a gas barrier film and a method for producing a gas barrier film. The gas barrier film of the present invention is suitable for packaging food products, pharmaceuticals, precision electronic components, and the like.

BACKGROUND

From the viewpoint of preventing the contents from being degraded and retaining the functions and nature of the contents, packaging materials used for packaging food products, non-food products, pharmaceuticals, and the like may be required to have gas barrier properties for protecting the contents from oxygen, moisture, and other gases passing through the packaging material and degrading the contents.

Known packaging materials having gas barrier properties include gas barrier films in which a metal foil such as an aluminum, which is less affected by temperature, humidity, and the like, is used as a gas barrier layer.

Another configuration of gas barrier films is known in which a vapor deposition film made of an inorganic oxide such as silicon oxide or aluminum oxide is formed by vacuum deposition, sputtering, or the like on the substrate film made of a polymer material (for example, see PTL 1). These gas barrier films are transparent and have barrier properties against gases such as oxygen and water vapor.

As the substrate film, polyethylene terephthalate (PET) films are common.

CITATION LIST

Patent Literature

[PTL 1] JP S60-49934 A.

SUMMARY OF THE INVENTION

Technical Problem

In recent years, there is an increasing demand for gas barrier films using a substrate film made of polypropylene (PP) or polyethylene (PE) from the viewpoint of reducing the environmental burden. PTL 1 also describes that a PP or PE substrate film can be used.

However, according to the investigation by the inventors, it was found that forming a barrier layer on the PP or PE substrate film in the gas barrier films is not sufficient in practice to impart resistance to hot water treatment such as boiling or retort treatment.

In view of the above circumstances, the present invention has been made to provide a gas barrier film having high resistance to hot water treatment and reducing the environmental burden, and a method for producing the same.

Solution to Problem

According to a first aspect of the present invention, a gas barrier film includes: a substrate mainly composed of polyethylene or polypropylene; a gas barrier layer formed on the substrate; and a cover layer formed on the gas barrier layer, wherein a surface of the substrate on which the gas barrier layer is formed has an element ratio O/C between oxygen and carbon of 0.03 or more.

According to a second aspect of the present invention, a method of producing a gas barrier film includes: applying a treatment to a surface of a substrate mainly composed of polyethylene or polypropylene to provide the surface with an element ratio O/C between oxygen and carbon of 0.03 or more; forming a gas barrier layer on the surface; and forming a cover layer on the gas barrier layer.

Advantageous Effects of the Invention

According to the present invention, a gas barrier film having high resistance to hot water treatment and reducing the environmental burden is provided.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

Figure 1:
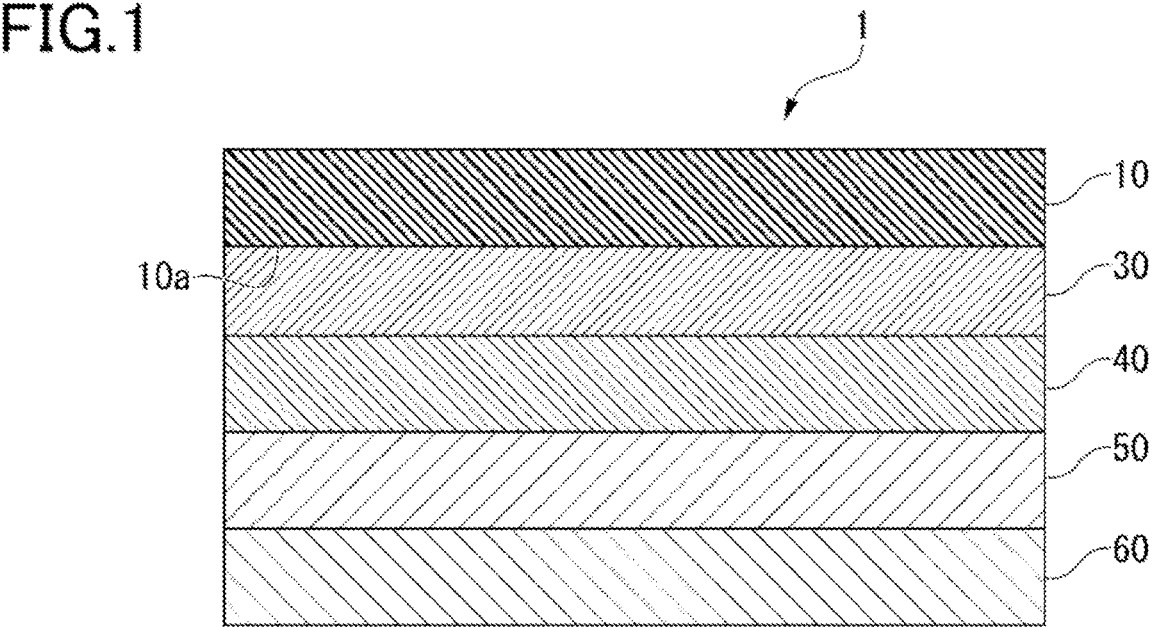
FIG. 1 is a schematic cross-sectional view of a gas barrier film according to an embodiment of the present invention.

With reference to FIG. 1, an embodiment of the present invention will be described below.

FIG. 1 is a schematic cross-sectional view of a gas barrier film 1 according to the present embodiment. The gas barrier film 1 includes a substrate 10, a gas barrier layer 30, a cover layer 40, an adhesive layer 50, and a sealant layer 60.

The substrate 10 is mainly composed of any of PP, PE, and polystyrene (PS) in order to reduce the environmental burden. These three resins may be used singly or in combination of two or more.

From the viewpoint of ensuring thermal stability, mechanical strength, dimensional stability, and the like, the synthetic resin constituting the substrate 10 is preferably a homopolymer polymerized alone. Further, from the viewpoint of imparting heat sealability and flexibility to the substrate 10, a copolymer or a terpolymer obtained by copolymerizing ethylene, 1-butene, and the like may also be used.

The substrate 10 may be a non-stretched film or a stretched film. When a stretched film is used, the stretch ratio is not specifically limited.

The thickness of the substrate 10 is not specifically limited. The substrate 10 may be a single layer film, or a multilayer film obtained by laminating films having different properties or the like according to the application of the packaging material. Practically, in view of processability for forming the gas barrier layer 30, the cover layer 40, and the like, the thickness of the substrate 10 is preferably 3 to 200 μm, and more preferably 6 to 30 μm.

The layers formed on the substrate 10, such as the gas barrier layer 30 and the cover layer 40, which are described later, may be formed on one side of the substrate 10, or may be formed on both sides of the substrate 10. The layers may be formed on one side of the substrate 10, and various known additives and stabilizers, such as antistatic agents, UV protectants, plasticizers, and lubricants may be formed on the other side of the substrate 10.

The substrate 10 has a surface 10a (hereinafter, also referred to as a first surface 10a) on a side on which at least the gas barrier layer 30 is formed. The surface 10a is subjected to a surface treatment so that an element ratio O/C between oxygen and carbon becomes 0.03 or more. If the surface treatment is not applied to the substrate 10 mainly composed of the above materials, the O/C ratio is less than 0.03, which is almost zero. However, due to the surface treatment being applied, the O/C ratio becomes 0.03 or more.

The inventors have found that, when the gas barrier layer 30 is formed on the surface of the substrate 10 having the O/C ratio of 0.03 or more, the adhesion between the substrate 10 and the gas barrier layer 30 exhibits high resistance to hot water treatment. The details of this will be described later.

The O/C ratio on the surface of the substrate 10 can be measured by X-ray photoelectron spectroscopy (XPS measurement). The XPS measurement can analyze the type and concentration of atoms in a region at several nm depth from the surface of the material to be measured, and the types and bonding state of atoms bonded to the atoms of the material to be measured to determine an element ratio, a functional group ratio, and the like.

In the gas barrier film according to the present embodiment, the XPS measurement cannot be performed on the surface of the substrate 10 when it is provided with the gas barrier layer 30 having 5 to 100 nm thickness. The measurement may be possible if performed after the gas barrier layer is removed by Ar ion etching. However, in this case, the surface of the substrate 10 is also etched, which makes the measurement result highly likely to be meaningless.

Therefore, in the O/C measurement according to the present invention, the XPS measurement is performed after the gas barrier layer 30 is removed by other methods. That is, the gas barrier layer 30 can be removed without etching the surface of the substrate 10 by immersing the gas barrier film 1 in a treatment solution containing weak alkaline amines.

Water contained in the treatment solution may be, but are not limited to, tap water, ion-exchanged water, distilled water, and the like. Examples of the weak alkaline amines include ammonia, triethanolamine, trimethanol amine, diethanolamine, triethylamine, trimethylamine, and the like, and two or more of these may be used. The concentration of the weak alkaline amines is preferably in a range of 0.01% to 10%. When the concentration is less than 0.01%, it takes a long time to remove the gas barrier layer 30. When the concentration is more than 10%, the surface of the substrate 10 may be contaminated, destroying the propylene structure.

The immersion conditions may be, for example, 50° C. or higher and 5 minutes.

The gas barrier layer 30 is a layer containing at least one of an inorganic substance, an inorganic oxide, an inorganic nitride, and an inorganic oxynitride, and exhibiting barrier properties against predetermined gases such as oxygen and water vapor. Examples of the inorganic substance constituting the gas barrier layer 30 include aluminum, silicon, magnesium, zirconium, titanium, and niobium. Further, the gas barrier layer 30 may contain one of aluminum, aluminum oxide, silicon oxide, or silicon oxide containing carbon.

The gas barrier layer 30 may be transparent or opaque.

The thickness of the gas barrier layer 30 varies depending on the type, composition, and film formation method of the inorganic compound used, but in general can be set appropriately in a range of 3 to 300 nm. When the thickness of the gas barrier layer 30 is less than 3 nm, the film may not be uniform or may not have a sufficient thickness, and may fail to sufficiently exhibit functions as a gas barrier layer. When the thickness of the gas barrier layer 30 is more than 300 nm, the hardness of the gas barrier layer 30 increases. Accordingly, when external factors such as bending and tension are applied after the film is formed, cracking may occur in the gas barrier layer 30, resulting in loss of barrier properties. Therefore, the thickness of the gas barrier layer 30 is preferably 6 to 150 nm.

The film formation method of the gas barrier layer 30 is not specifically limited. For example, vapor deposition, sputtering, ion plating, ion beam method, plasma vapor deposition (CVD), and the like can be used. These methods can be combined with a plasma assisted method, an ion assisted method, or the like to form a gas barrier layer with high density to thereby enhance barrier properties and adhesiveness.

The barrier properties of the gas barrier layer 30 can be further enhanced by the cover layer 40. The cover layer 40 is formed using a coating agent having a base resin composed of an aqueous solution or a water/alcohol mixed solution containing (1) one or more metal alkoxides or hydrolyzates thereof and (2) a water-soluble polymer. For example, the coating agent is prepared by mixing a solution in which a water-soluble polymer is dissolved in an aqueous (water or water/alcohol mixture) solvent with a metal alkoxide directly or an alkoxide hydrolyzed in advance. The coating agent is applied to the gas barrier layer 30, and dried to form the cover layer 40.

The details of the components contained in the coating agent for forming the cover layer 40 will be described.

Examples of the water-soluble polymer used for the coating agent may include polyvinyl alcohol (PVA), polyvinyl pyrrolidone, starch, methyl cellulose, carboxymethyl cellulose, and sodium alginate. In particular, PVA is preferable since it is suitable for obtaining excellent gas barrier properties. PVA is typically obtained by saponifying polyvinyl acetate. The PVA may be either a partially saponified PVA, in which several tens % of acetate groups remain, or a fully saponified PVA, in which only several % of acetate groups remain. A PVA intermediate between these PVAs may also be used.

The metal alkoxide used for the coating agent is a compound represented by the general formula $M(OR)n$ (where M is a metal such as Si or Al, and R is an alkyl group such as $CH_3$ and $C_2H_5$). Specifically, tetraethoxysilane [Si($OC_2H_5$)$_4$], triisopropoxy aluminum Al[OCH($CH_3$)$_2$]$_3$, or the like may be used. Examples of silane coupling agents include a compound having an epoxy group such as 3-glycidoxypropyltrimethoxysilane, a compound having an amino group such as 3-aminopropyltrimethoxysilane, a compound having a mercapto group such as 3-mercaptopropyltrimethoxysilane, a compound having an isocyanate group such as 3-isocyanate propyltriethoxysilane, and tris-(3-trimethoxysilylpropyl) isocyanurate.

The method of applying the coating agent is not specifically limited. Any method commonly used and known in the art, such as dipping, roll coating, screen printing, spraying, gravure printing, or the like may be selected as appropriate.

The thickness of the cover layer 40 varies depending on the composition, coating conditions, and the like of the coating agent, and is not specifically limited. However, when the dry thickness of the cover layer 40 is 0.01 μm or less, the film may not be uniform, resulting in a failure in obtaining sufficient gas barrier properties. When the dry thickness is more than 50 μm, cracking may easily occur in the cover layer 40. Therefore, a preferable thickness of the cover layer 40 may be, for example, 0.01 to 50 μm. An optimum thickness of the cover layer 40 may be, for example, 0.1 to 10 μm.

The sealant layer 60 is a layer bonded by thermal fusion when a bag-like package is formed using the gas barrier film 1. Examples of the materials of the sealant layer 60 include resin materials such as polyethylene, polypropylene, an ethylene-vinyl acetate copolymer, an ethylene-methacrylic acid copolymer, an ethylene-methacrylic acid ester copolymer, an ethylene-acrylic acid copolymer, an ethylene-acrylic acid ester copolymer, and metal crosslinked products thereof. The thickness of the sealant layer 60 is determined depending on the application, and may be, for example, 15 to 200 μm.

The adhesive layer 50 is used for adhesion between the sealant layer 60 and the cover layer 40. The sealant layer 60 made of a resin film and the substrate 10 on which the gas barrier layer 30 and the cover layer 40 are formed can be bonded to each other via the adhesive layer 50 by dry lamination. An example of the material of the adhesive layer 50 includes a two-part curing type polyurethane-based adhesive.

The packaging material may also include a print layer, an interposed film, a sealant layer, or the like laminated on the cover layer 40.

A method of forming the gas barrier film 1 of the present embodiment having the above configuration will be described.

First, one surface (first surface 10a) of the substrate 10 is subjected to a surface treatment so that O/C ratio of the treated surface becomes 0.03 or more (first step). In the first step, a plurality of oxygen-containing bonds such as CO bonds and COO bonds are formed on the treated surface of the substrate 10.

Next, a gas barrier layer 30 is formed on the treated surface by an appropriate method (second step). In the second step, inorganic compounds constituting the gas barrier layer 30 strongly bind to the oxygen-containing bonds which are present on the treated surface of the substrate 10. Accordingly, the gas barrier layer 30 and the substrate 10 strongly adhere to each other.

Next, the above coating agent is applied to the gas barrier layer 30 and dried to form a cover layer 40 on the gas barrier layer (third step).

Further, an adhesive is applied to a surface of the cover layer 40, and a resin film as the sealant layer 60 is bonded to the cover layer 40 (fourth step). Thus, a gas barrier film 1 is formed.

In the gas barrier film 1 configured as described above, chemical bonds such as hydrogen bonds or covalent bonds are formed between the substrate 10 and the gas barrier layer 30 due to a hydroxyl group, a carboxyl group, or the like being present on the surface (first surface 10a) of the substrate 10. Accordingly, adhesion is less likely to decrease even after hot water treatment. As a result, adhesion between the substrate 10 and the gas barrier layer 30 is reliably maintained.

The gas barrier film according to the present embodiment will be further described using the examples and comparative examples. The present invention should not be limited in any way by the specific content of the examples and comparative examples.

Example 1

A polypropylene film (20 μm thickness) made of a homopolymer was used as the substrate 10. One surface (first surface 10a) of the substrate 10 was subjected to a plasma treatment by glow discharge (output 230 W) in a vacuum device. The atmosphere was oxygen gas (10 Pa).

Subsequently, aluminum was evaporated while introducing oxygen in the same vacuum device to form a gas barrier layer 30 (10 nm thickness) composed of an aluminum oxide by electron beam deposition.

A plurality of sample films were prepared as described above, and one of them was immersed in distilled water, to which 1.0 wt % triethanolamine was added, at 80° for 5 minutes to remove the gas barrier layer. Then, XPS measurement (described later) was performed on the treated surface (first surface 10a) of the substrate.

For the other sample films, a coating agent, which was obtained by mixing the following solution (1) and the solution (2) at a weight ratio of 6:4, was applied to the gas barrier layer 30 by gravure coating, and dried to form a cover layer 40 of 0.4 μm thickness.

Solution (1): Hydrolyzed solution of a solid content of 3 wt % (equivalent to $SiO_2$) obtained by adding 89.6 g of hydrochloric acid (0.1 N) to 10.4 g of tetraethoxysilane, and stirring for 30 minutes for hydrolysis Solution (2): 3 wt % polyvinyl alcohol solution (solvent was water/isopropyl alcohol (water:isopropyl alcohol at weight ratio of 90:10))

Finally, a non-stretched polypropylene film (70 μm thickness) as a sealant layer 60 was bonded to the cover layer 40 by dry lamination using two-part curing type polyurethane-based adhesive. Thus, a gas barrier film of Example 1 was prepared.

Example 2

A gas barrier film of Example 2 was prepared in the same manner as in Example 1 except that the vapor deposition material was SiO and a 30 nm-thick gas barrier layer 30 containing silicon oxide was formed. The XPS measurement was performed in the same manner as described above.

Example 3

A gas barrier film of Example 3 was prepared in the same manner as in Example 1 except that the vapor deposition material was hexamethyldisiloxane (HMDSO) and a 30 nm-thick gas barrier layer 30 containing carbon-containing silicon oxide was formed by plasma. The XPS measurement was performed in the same manner as described above.

Example 4

A gas barrier film of Example 4 was prepared in the same manner as in Example 1 except that the output of the plasma treatment in the surface treatment was 350 W. The XPS measurement was performed in the same manner as described above.

Example 5

A gas barrier film of Example 5 was prepared in the same manner as in Example 2 except that the output of the plasma treatment in the surface treatment was 350 W. The XPS measurement was performed in the same manner as described above.

Example 6

A gas barrier film of Example 6 was prepared in the same manner as in Example 3 except that the output of the plasma treatment in the surface treatment was 350 W. The XPS measurement was performed in the same manner as described above.

Example 7

A gas barrier film of Example 7 was prepared in the same manner as in Example 1 except that the output of the plasma treatment in the surface treatment was 470 W. The XPS measurement was performed in the same manner as described above.

Example 8

A gas barrier film of Example 8 was prepared in the same manner as in Example 2 except that the output of the plasma treatment in the surface treatment was 470 W. The XPS measurement was performed in the same manner as described above.

Example 9

A gas barrier film of Example 9 was prepared in the same manner as in Example 3 except that the output of the plasma treatment in the surface treatment was 470 W. The XPS measurement was performed in the same manner as described above.

Example 10

A gas barrier film of Example 10 was prepared in the same manner as in Example 1 except that the output of the plasma treatment in the surface treatment was 930 W. The XPS measurement was performed in the same manner as described above.

Example 11

A gas barrier film of Example 11 was prepared in the same manner as in Example 2 except that the output of the plasma treatment in the surface treatment was 930 W. The XPS measurement was performed in the same manner as described above.

Example 12

A gas barrier film of Example 12 was prepared in the same manner as in Example 3 except that the output of the plasma treatment in the surface treatment was 930 W. The XPS measurement was performed in the same manner as described above.

Example 13

A gas barrier film of Example 13 was prepared in the same manner as in Example 1 except that a polypropylene film (copolymer) containing ethylene was used as the substrate. The XPS measurement was performed in the same manner as described above.

Example 14

A gas barrier film of Example 14 was prepared in the same manner as in Example 2 except that a polypropylene film (copolymer) containing ethylene was used as the substrate. The XPS measurement was performed in the same manner as described above.

Example 15

A gas barrier film of Example 15 was prepared in the same manner as in Example 3 except that a polypropylene film (copolymer) containing ethylene was used as the substrate. The XPS measurement was performed in the same manner as described above.

Example 16

A gas barrier film of Example 16 was prepared in the same manner as in Example 1 except that a polypropylene film (terpolymer) containing ethylene and 1-butene was used as the substrate. The XPS measurement was performed in the same manner as described above.

Example 17

A gas barrier film of Example 17 was prepared in the same manner as in Example 2 except that a polypropylene film (terpolymer) containing ethylene and 1-butene was used as the substrate. The XPS measurement was performed in the same manner as described above.

Example 18

A gas barrier film of Example 18 was prepared in the same manner as in Example 3 except that a polypropylene film (terpolymer) containing ethylene and 1-butene was used as the substrate. The XPS measurement was performed in the same manner as described above.

Example 19

A gas barrier film of Example 19 was prepared in the same manner as in Example 2 except that a low density polyethylene film (25 μm thickness) was used as the substrate. The XPS measurement was performed in the same manner as described above.

Example 20

A gas barrier film of Example 20 was prepared in the same manner as in Example 19 except that a high density polyethylene film was used as the substrate. The XPS measurement was performed in the same manner as described above.

Example 21

A gas barrier film of Example 20 was prepared in the same manner as in Example 19 except that a high density polyethylene film (copolymer) containing 1-butene was used as the substrate. The XPS measurement was performed in the same manner as described above.

Comparative Example 1

A gas barrier film of Comparative example 1 was prepared in the same manner as in Example 1 except that a surface treatment was not applied to the substrate. The XPS measurement was performed in the same manner as described above.

Comparative Example 2

A gas barrier film of Comparative example 2 was prepared in the same manner as in Example 2 except that a surface treatment was not applied to the substrate. The XPS measurement was performed in the same manner as described above.

Comparative Example 3

A gas barrier film of Comparative example 3 was prepared in the same manner as in Example 3 except that a surface treatment was not applied to the substrate. The XPS measurement was performed in the same manner as described above.

Comparative Example 4

A gas barrier film of Comparative example 4 was prepared in the same manner as in Example 13 except that a surface treatment was not applied to the substrate. The XPS measurement was performed in the same manner as described above.

Comparative Example 5

A gas barrier film of Comparative example 5 was prepared in the same manner as in Example 14 except that a surface treatment was not applied to the substrate. The XPS measurement was performed in the same manner as described above.

Comparative Example 6

A gas barrier film of Comparative example 6 was prepared in the same manner as in Example 15 except that a surface treatment was not applied to the substrate. The XPS measurement was performed in the same manner as described above.

Comparative Example 7

A gas barrier film of Comparative example 7 was prepared in the same manner as in Example 16 except that a surface treatment was not applied to the substrate. The XPS measurement was performed in the same manner as described above.

Comparative Example 8

A gas barrier film of Comparative example 8 was prepared in the same manner as in Example 17 except that a surface treatment was not applied to the substrate. The XPS measurement was performed in the same manner as described above.

Comparative Example 9

A gas barrier film of Comparative example 9 was prepared in the same manner as in Example 18 except that a surface treatment was not applied to the substrate. The XPS measurement was performed in the same manner as described above.

Comparative Example 10

A gas barrier film of Comparative example 10 was prepared in the same manner as in Example 19 except that a surface treatment was not applied to the substrate. The XPS measurement was performed in the same manner as described above.

Comparative Example 11

A gas barrier film of Comparative example 11 was prepared in the same manner as in Example 20 except that a surface treatment was not applied to the substrate. The XPS measurement was performed in the same manner as described above.

Comparative Example 12

A gas barrier film of Comparative example 12 was prepared in the same manner as in Example 21 except that a surface treatment was not applied to the substrate. The XPS measurement was performed in the same manner as described above.

Comparative Example 13

A gas barrier film of Comparative example 13 was prepared in the same manner as in Example 10 except that a surface treatment was applied to the substrate in an oxygen-free argon atmosphere. The XPS measurement was performed in the same manner as described above.

Comparative Example 14

A gas barrier film of Comparative example 14 was prepared in the same manner as in Example 11 except that a surface treatment was applied to the substrate in an oxygen-free argon atmosphere. The XPS measurement was performed in the same manner as described above.

Comparative Example 15

A gas barrier film of Comparative example 15 was prepared in the same manner as in Example 12 except that a surface treatment was applied to the substrate in an oxygen-free argon atmosphere. The XPS measurement was performed in the same manner as described above.

The content of evaluation items including the XPS measurement will be described below.

(XPS Measurement of Substrate Surface)

The first surface $10a$ of the substrate 10 of each sample was measured using an X-ray photoelectron spectrometer. The X-ray photoelectron spectrometer was a JPS-9010MX manufactured by JEOL Ltd. The X-ray source used was non-monochromatic MgKα (1253.6 eV), and the output was 100 W (10 kV-10 mA).

In the quantitative analysis, calculation was performed using relative sensitivity factors of 2.28 for O1$s$ and 1.00 for C1$s$. The waveform separation analysis of the C1$s$ waveform was performed using a mixed function of Gaussian function and Lorentzian function, and the charge compensation was performed using a C—C bond peak derived from a benzene ring at 285.0 eV.

In the obtained O1$s$ spectrum, a baseline was drawn by connecting the plots at 529 eV and 536 eV, and an area surrounded by the spectrum and the baseline was calculated. For the C1$s$ spectrum, a baseline was drawn by connecting the plots at 282 eV and 288 eV, and an area surrounded by the spectrum and the baseline was calculated. Based on the area value, the O/C ratio in each example was calculated.

The XPS measurement was performed on a surface exposed after the gas barrier layer was removed.

Figure 2:
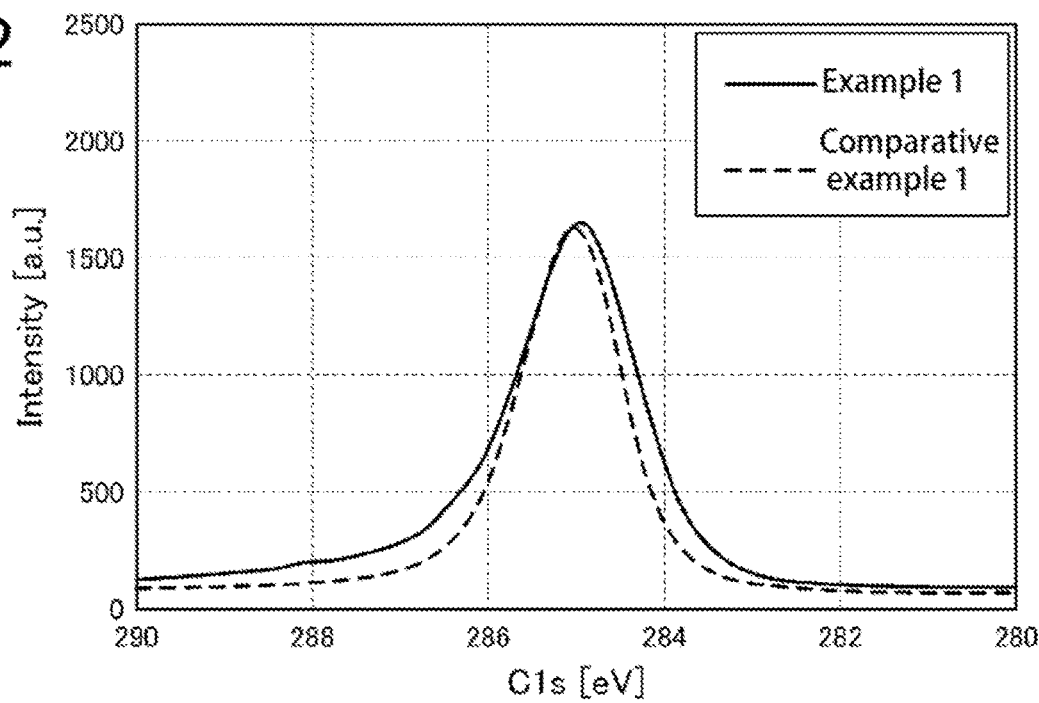
FIG. 2 shows C1$s$ spectra of an example of the present invention and a comparative example.
Figure 3:
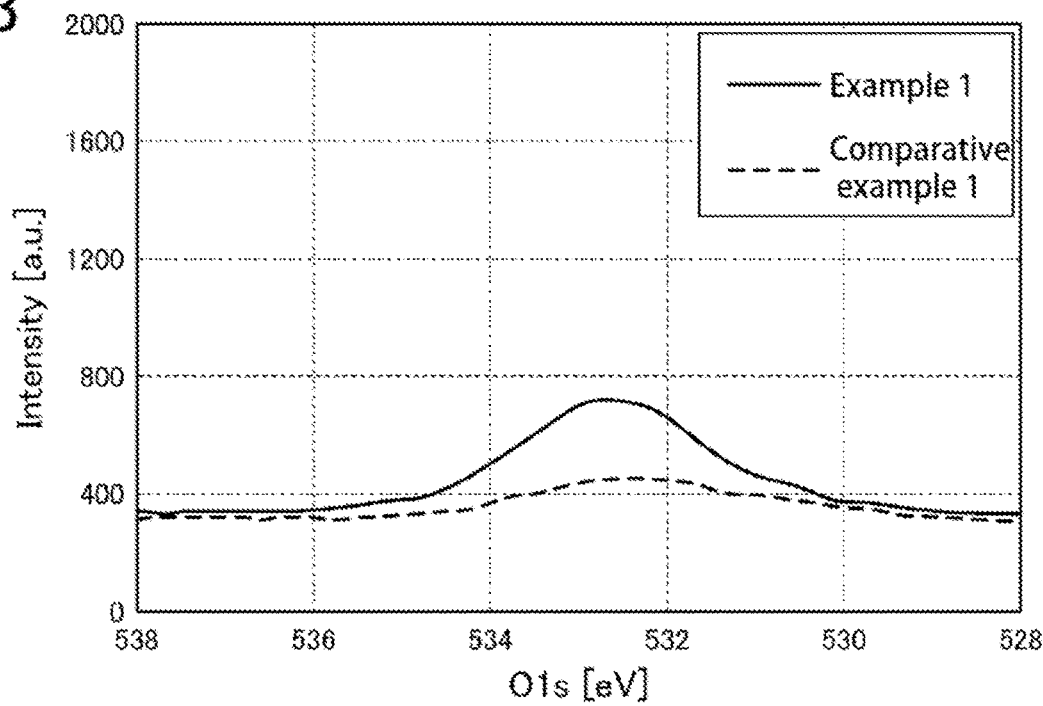
FIG. 3 shows O1$s$ spectra of an example of the present invention and a comparative example.

FIG. 2 shows the C1$s$ spectra of Example 1 and Comparative example 1, and FIG. 3 shows the O1$s$ spectra of Example 1 and Comparative example 1.

(Evaluation of Gas Barrier Layer Adhesion after Hot Water Treatment)

In each example, two gas barrier films were overlapped with the sealant layers 60 facing each other, and three sides were bonded by thermal fusion to form a pouch (packaging container) of each example. After the pouch of each example was filled with water as the contents, the open side was sealed by thermal fusion. Then, a retort sterilization treatment (121° C. for 30 minutes) or a boiling treatment (98° C. for 30 minutes) was performed as a hot water treatment.

After the hot water treatment, a test piece was obtained by cutting out a portion of the pouch that had been in contact with the contents in each example in accordance with JIS Z 1707. A peel strength between the substrate 10 and the gas barrier layer 30 was measured using a Tensilon universal testing machine RTC-1250 manufactured by Orientec Corporation, and the measured peel strength was used as an index of adhesion. In the measurement, two types of peeling, T-peel and 180 degree peel, were performed in a normal state (dry) and a wet state at the measurement site (wet).

(Evaluation of Gas Barrier Properties after Hot Water Treatment)

After the pouch of each example was prepared by the above procedure and subjected to hot water treatment, the pouch was opened to evaluate the oxygen permeability (unit: cc/m$^2$·day·atm, measurement condition: 30° C.-70% RH) and the water vapor permeability (unit: g/m$^2$·day, measurement condition: 40° C.-90% RH) of the gas barrier film.

Table 1 shows the results.

TABLE 1

| | Substrate | Plasma treatment | | O/C (at %) | Barrier layer | Film thickness (nm) | Hot water treatment conditions |
|---|---|---|---|---|---|---|---|
| | | Output (W) | Gas | | | | |
| Example 1 | polypropylene (homopolymer) | 230 | O$_2$ | 0.03 | AlOx | 10 | 121° C. 30 min. |
| Example 2 | polypropylene (homopolymer) | 230 | O$_2$ | 0.03 | SiOx | 30 | 121° C. 30 min. |
| Example 3 | polypropylene (homopolymer) | 230 | O$_2$ | 0.03 | SiOxCy | 30 | 121° C. 30 min. |
| Example 4 | polypropylene (homopolymer) | 350 | O$_2$ | 0.14 | AlOx | 10 | 121° C. 30 min. |
| Example 5 | polypropylene (homopolymer) | 350 | O$_2$ | 0.14 | SiOx | 30 | 121° C. 30 min. |
| Example 6 | polypropylene (homopolymer) | 350 | O$_2$ | 0.14 | SiOxCy | 30 | 121° C. 30 min. |
| Example 7 | polypropylene (homopolymer) | 470 | O$_2$ | 0.18 | AlOx | 10 | 121° C. 30 min. |
| Example 8 | polypropylene (homopolymer) | 470 | O$_2$ | 0.18 | SiOx | 30 | 121° C. 30 min. |
| Example 9 | polypropylene (homopolymer) | 470 | O$_2$ | 0.18 | SiOxCy | 30 | 121° C. 30 min. |
| Example 10 | polypropylene (homopolymer) | 930 | O$_2$ | 0.22 | AlOx | 10 | 121° C. 30 min. |
| Example 11 | polypropylene (homopolymer) | 930 | O$_2$ | 0.22 | SiOx | 30 | 121° C. 30 min. |

TABLE 1-continued

| | | | | | | | |
|---|---|---|---|---|---|---|---|
| Example 12 | polypropylene (homopolymer) | 930 | O₂ | 0.22 | SiOxCy | 30 | 121° C. 30 min. |
| Example 13 | polypropylene/ethylene (copolymer) | 230 | O₂ | 0.03 | AlOx | 10 | 121° C. 30 min. |
| Example 14 | polypropylene/ethylene (copolymer) | 230 | O₂ | 0.03 | SiOx | 30 | 121° C. 30 min. |
| Example 15 | polypropylene/ethylene (copolymer) | 230 | O₂ | 0.03 | SiOxCy | 30 | 121° C. 30 min. |
| Example 16 | polypropylene/ethylene/ 1-butene (terpolymer) | 230 | O₂ | 0.03 | AlOx | 10 | 121° C. 30 min. |
| Example 17 | polypropylene/ethylene/ 1-butene (terpolymer) | 230 | O₂ | 0.03 | SiOx | 30 | 121° C. 30 min. |
| Example 18 | polypropylene/ethylene/ 1-butene (terpolymer) | 230 | O₂ | 0.03 | SiOxCy | 30 | 121° C. 30 min. |
| Example 19 | low density polyethylene | 230 | O₂ | 0.03 | SiOx | 30 | 98° C. 30 min. |
| Example 20 | high density polyethylene | 230 | O₂ | 0.03 | SiOx | 30 | 98° C. 30 min. |
| Example 21 | high density polyethylene/1-butene (copolymer) | 230 | O₂ | 0.03 | SiOx | 30 | 98° C. 30 min. |
| Comparative example 1 | polypropylene (homopolymer) | — | — | 0.02 | AlOx | 10 | 121° C. 30 min. |
| Comparative example 2 | polypropylene (homopolymer) | — | — | 0.02 | SiOx | 30 | 121° C. 30 min. |
| Comparative example 3 | polypropylene (homopolymer) | — | — | 0.02 | SiOxCy | 30 | 121° C. 30 min. |
| Comparative example 4 | polypropylene/ethylene (copolymer) | — | — | 0.01 | AlOx | 10 | 121° C. 30 min. |
| Comparative example 5 | polypropylene/ethylene (copolymer) | — | — | 0.02 | SiOx | 30 | 121° C. 30 min. |
| Comparative example 6 | polypropylene/ethylene (copolymer) | — | — | 0.02 | SiOxCy | 30 | 121° C. 30 min. |
| Comparative example 7 | polypropylene/ethylene/ 1-butene (terpolymer) | — | — | 0.02 | AlOx | 10 | 121° C. 30 min. |
| Comparative example 8 | polypropylene/ethylene/ 1-butene (terpolymer) | — | — | 0.01 | SiOx | 30 | 121° C. 30 min. |
| Comparative example 9 | polypropylene/ethylene/ 1-butene (terpolymer) | — | — | 0.02 | SiOxCy | 30 | 121° C. 30 min. |
| Comparative example 10 | low density polyethylene | — | — | 0.01 | SiOx | 30 | 98° C. 30 min. |
| Comparative example 11 | high density polyethylene | — | — | 0.02 | SiOx | 30 | 98° C. 30 min. |
| Comparative example 12 | high density polyethylene/1-butene (copolymer) | — | — | 0.02 | SiOx | 30 | 98° C. 30 min. |
| Comparative example 13 | polypropylene (homopolymer) | 930 | Ar | 0.02 | AlOx | 10 | 121° C. 30 min. |
| Comparative example 14 | polypropylene (homopolymer) | 930 | Ar | 0.02 | SiOx | 30 | 121° C. 30 min. |
| Comparative example 15 | polypropylene (homopolymer) | 930 | Ar | 0.02 | SiOxCy | 30 | 121° C. 30 min. |

| | Peel strength after hot water treatment (N/15 mm) | | | | Gas barrier layer adhesion after hot water treatment | |
|---|---|---|---|---|---|---|
| | Dry T | Dry 180° | Wet T | Wet 180° | oxygen (cc/m² · day · atm) | water vapor (g/m² · day) |
| Example 1 | 3.5 | 2.1 | 3.0 | 2.1 | 0.8 | 0.6 |
| Example 2 | 3.3 | 2.0 | 2.7 | 2.0 | 0.5 | 0.5 |
| Example 3 | 3.2 | 2.2 | 2.2 | 2.2 | 0.8 | 0.8 |
| Example 4 | 4.0 | 2.3 | 3.2 | 2.3 | 0.8 | 0.6 |
| Example 5 | 3.3 | 2.0 | 2.7 | 2.0 | 0.5 | 0.4 |
| Example 6 | 3.2 | 2.0 | 2.2 | 2.0 | 0.7 | 0.7 |
| Example 7 | 4.2 | 2.5 | 3.3 | 2.3 | 0.8 | 0.6 |
| Example 8 | 3.3 | 2.2 | 2.1 | 2.1 | 0.5 | 0.4 |
| Example 9 | 3.1 | 2.0 | 2.1 | 2.2 | 0.9 | 0.5 |
| Example 10 | 4.6 | 2.8 | 3.5 | 2.2 | 0.8 | 0.4 |
| Example 11 | 3.3 | 2.2 | 2.1 | 2.1 | 0.5 | 0.3 |
| Example 12 | 3.3 | 2.3 | 2.7 | 2.1 | 0.7 | 0.4 |
| Example 13 | 4.6 | 2.2 | 3.3 | 2.3 | 0.5 | 0.6 |
| Example 14 | 3.3 | 2.0 | 2.7 | 2.0 | 0.7 | 0.4 |
| Example 15 | 3.1 | 2.1 | 3.2 | 2.1 | 0.3 | 0.5 |
| Example 16 | 4.7 | 2.3 | 3.5 | 2.0 | 0.5 | 0.6 |
| Example 17 | 4.0 | 2.0 | 3.2 | 2.3 | 0.8 | 0.4 |
| Example 18 | 3.3 | 2.2 | 3.1 | 2.1 | 0.3 | 0.5 |
| Example 19 | 3.2 | 2.1 | 3.0 | 2.3 | 0.5 | 0.6 |
| Example 20 | 3.3 | 2.3 | 3.2 | 2.0 | 0.8 | 0.4 |
| Example 21 | 3.5 | 2.1 | 3.0 | 2.1 | 0.3 | 0.5 |

TABLE 1-continued

| | | | | | | |
|---|---|---|---|---|---|---|
| Comparative example 1 | 0.3 | 0.1 | 0.2 | 0.1 | 3.6 | 3.6 |
| Comparative example 2 | 0.2 | 0.1 | 0.2 | 0.1 | 2.5 | 3.5 |
| Comparative example 3 | 0.2 | 0.1 | 0.2 | 0.1 | 3.0 | 3.8 |
| Comparative example 4 | 0.5 | 0.2 | 0.4 | 0.2 | 2.5 | 2.5 |
| Comparative example 5 | 0.4 | 0.2 | 0.4 | 0.2 | 2.6 | 2.4 |
| Comparative example 6 | 0.4 | 0.2 | 0.4 | 0.2 | 2.4 | 2.5 |
| Comparative example 7 | 0.5 | 0.2 | 0.5 | 0.2 | 2.5 | 2.6 |
| Comparative example 8 | 0.4 | 0.2 | 0.4 | 0.2 | 2.8 | 2.4 |
| Comparative example 9 | 0.4 | 0.2 | 0.4 | 0.2 | 3.3 | 2.5 |
| Comparative example 10 | 0.1 | 0.1 | 0.1 | 0.1 | 0.5 | 0.6 |
| Comparative example 11 | 0.1 | 0.1 | 0.1 | 0.1 | 0.8 | 0.4 |
| Comparative example 12 | 0.1 | 0.1 | 0.1 | 0.1 | 0.3 | 0.5 |
| Comparative example 13 | 0.3 | 0.1 | 0.3 | 0.1 | 2.2 | 2.6 |
| Comparative example 14 | 0.2 | 0.1 | 0.3 | 0.1 | 2.0 | 2.4 |
| Comparative example 15 | 0.2 | 0.1 | 0.2 | 0.1 | 2.8 | 2.7 |

In all the gas barrier films of Examples, the O/C ratio of the treated surface was 0.03 or more and high adhesion between the substrate and the gas barrier layer was maintained after the water treatment. More specifically, the peel strength between the substrate and the gas barrier layer (peel strength of T-peel and peel strength of 180° peel) was 1 N/15 mm or more in the normal state (dry) and the wet state at the measurement site (wet) even after hot water treatment was performed at a temperature of 98° C. or higher for 30 minutes or more. This indicates high adhesion between the two layers. Further, excellent gas barrier properties were observed even after the hot water treatment.

On the other hand, in all the gas barrier films of Comparative examples, the O/C ratio of the substrate surface was less than 0.03. In the gas barrier films of Comparative examples, the peel strength between the substrate and the gas barrier layer was less than 1 N/15 mm in both measurement conditions. Since the adhesion between the gas barrier layer and the substrate after the hot water treatment was significantly low, delamination easily occurred. The gas barrier properties after the hot water treatment were generally poor.

In general, it is considered that adhesion between a surface and a gas barrier layer formed thereon increases with an increase in surface roughness of the substrate due to an anchor effect. However, in Comparative examples 13 to 15, in which the substrate has an increased surface roughness due to plasma treatment, adhesiveness of the gas barrier layer after the hot water treatment cannot be prevented from decreasing.

As seen from the above, it is found that, when the gas barrier film is formed using the substrate having a low environmental burden as in the present embodiment, the oxygen-containing bond on the substrate surface plays an important role in the adhesion between the substrate and the gas barrier layer and the resistance to hot water treatment in the gas barrier properties. This is a finding that has been clarified for the first time in the present invention.

While an embodiment and the examples of the present invention have been described, the specific configurations are not limited to the above embodiment. Various modifications and combinations of the configurations can be made without departing from the principle of the present invention.

For example, in the gas barrier film of the present invention, the gas barrier layer and the cover layer may be provided on both sides of the substrate. In this case, the element ratio O/C between oxygen and carbon on the surfaces of both sides of the substrate may be 0.03 or more.

Furthermore, in the gas barrier film of the present invention, a print layer may be provided at an appropriate position. An interposed film may also be disposed on the cover layer to impart desired physical properties such as pinhole resistance, cold stability, thermal stability, drop resistance, and tear resistance to the gas barrier film.

Furthermore, in the gas barrier film of the present invention, an adhesive layer and a sealant layer may not be necessarily provided. That is, an adhesive layer and a sealant layer may be provided as necessary depending on the specific application or the like of the gas barrier film.

REFERENCE SIGNS LIST

1 . . . Gas barrier film; 10 . . . Substrate; 10a . . . Surface (first surface); 30 . . . Gas barrier layer; 40 . . . Coating layer; 50 . . . Adhesive layer; 60 . . . Sealant layer.

What is claimed is:
1. A gas barrier film, comprising:
a substrate mainly composed of polyethylene or polypropylene;
a gas barrier layer formed on the substrate; and
a cover layer formed on the gas barrier layer, wherein
a surface of the substrate on which the gas barrier layer is formed has an element ratio O/C between oxygen and carbon of 0.03 or more and wherein an oxygen permeability of the gas barrier film measured at 30° C. at 70% relative humidity after hot water treatment performed at a temperature of 98° C. or higher for 30 minutes or more is from 0.3 to 0.9 cc/m$^2$·day·atm.

2. The gas barrier film of claim 1, wherein the gas barrier layer contains one of aluminum, aluminum oxide, silicon oxide, or silicon oxide containing carbon.

3. The gas barrier film of claim 1, wherein the cover layer contains one or more alkoxides or hydrolyzates thereof, and a water soluble polymer.

4. The gas barrier film of claim 1, further comprising a sealant layer that is thermally fusible.

5. The gas barrier film of claim 4, wherein the sealant layer is bonded to the cover layer via an adhesive layer.

6. The gas barrier film of claim 1, wherein a peel strength between the substrate and the gas barrier layer is 1 N/15 mm or more after the hot water treatment.

7. The gas barrier film of claim 1, wherein the surface of the substrate on which the gas barrier layer is formed has an element ratio O/C between oxygen and carbon of from 0.03 to 0.07.

8. The gas barrier film of claim 1, wherein the peel strength between the substrate and the gas barrier layer is from 2.0 N/15 mm to 4.7 N/15 mm after the hot water treatment.

9. A method of producing a gas barrier film, comprising the steps of:
   applying a treatment to a surface of a substrate mainly composed of polyethylene or polypropylene to provide the surface with an element ratio O/C between oxygen and carbon of 0.03 or more;
   forming a gas barrier layer on the surface; and
   forming a cover layer on the gas barrier layer, wherein the produced gas barrier film has an oxygen permeability of the gas barrier film measured at 30° C. at 70% relative humidity after hot water treatment performed at a temperature of 98° C. or higher for 30 minutes or more is from 0.3 to 0.9 cc/m$^2$·day·atm.

10. The method of claim 9, wherein said applying provides the surface with the element ratio O/C between oxygen and carbon from 0.03 to 0.07.

11. The method of claim 9, wherein the produced gas barrier film has a peel strength between the substrate and the gas barrier layer from 2.0 N/15 mm to 4.7 N/15 mm after the hot water treatment.

* * * * *